United States Patent
Raifel et al.

(10) Patent No.: US 8,121,260 B2
(45) Date of Patent: Feb. 21, 2012

(54) METHOD AND APPARATUS FOR RETRAINING OF ECHO CANCELLATION

(75) Inventors: Mark Raifel, Ra'anana (IL); Yakov Chen, Rishon Letzion (IL); Eli Shoval, Rosh Ha'ayin (IL)

(73) Assignee: AudioCodes Ltd., Lod (IL)

( * ) Notice: Subject to any disclaimer, the term of this patent is extended or adjusted under 35 U.S.C. 154(b) by 1370 days.

(21) Appl. No.: 11/723,837

(22) Filed: Mar. 22, 2007

(65) Prior Publication Data

US 2008/0232577 A1   Sep. 25, 2008

(51) Int. Cl.
*H04M 1/24* (2006.01)
*H04M 3/08* (2006.01)
*H04M 3/22* (2006.01)
*H04M 9/08* (2006.01)

(52) U.S. Cl. .................................. 379/3; 379/406.1
(58) Field of Classification Search ............ 379/3, 22.08, 379/406.01, 406.05, 406.1; 370/286, 289, 370/290, 292
See application file for complete search history.

(56) References Cited

U.S. PATENT DOCUMENTS

| 5,592,548 | A | 1/1997 | Sih |
| 6,400,802 | B1* | 6/2002 | Legare ............................. 379/3 |
| 6,999,560 | B1* | 2/2006 | Connor et al. .................... 379/3 |
| 7,787,597 | B1* | 8/2010 | Shlomot et al. .................. 379/3 |
| 2004/0228454 | A1* | 11/2004 | Chen et al. ........................ 379/3 |

FOREIGN PATENT DOCUMENTS

WO   WO 2005099231 A1 * 10/2005

OTHER PUBLICATIONS

International Telecommunication Union ITU-T G.168 (Aug. 2004): "Digital Network Echo Cancellers".

* cited by examiner

*Primary Examiner* — Quoc D Tran
(74) *Attorney, Agent, or Firm* — Eitan Mehulal Law Group

(57) ABSTRACT

A method of determining if an echo canceller comprised in a communication channel that is used to transmit at least one tonal signal and characterized by a model echo path of the channel, is acceptably adapted to cancel echoes in the channel, the method comprising: determining a performance measure how well the canceller cancels echoes of at least one test signal characterized by at least one frequency different from a frequency of the at least one tonal signal; and determining if the canceller is acceptably adapted responsive to the measure.

20 Claims, 3 Drawing Sheets

METHOD AND APPARATUS FOR RETRAINING OF ECHO CANCELLATION

FIELD

The invention relates to echo canceling.

BACKGROUND

Communication over telecommunication networks, in particular voice-handling networks such as the public switched telephone network (PSTN) has fostered an ever-increasing demand for improved speech quality, and for improved reliability of voice-band data transfer and fax. In order to cope with these demands network providers constantly search for means to control and/or eliminate factors, which contribute to interference in a communication channel, such as, for example, echo.

Echo in a communication channel is a phenomenon in which a delayed and usually at least partially distorted replica of an original signal sent from a first terminal (communication device) in the communication channel is reflected back to the first terminal from an echo source at, or on the way to, a second terminal in the communication channel. Echoes conventionally referred to as network or electronic echoes are often a result of an impedance mismatch in a connection of a two-wire telephone line to a four-wire telephone line provided by a hybrid circuit at a switching exchange of the PSTN. Acoustic echoes are generated by acoustic coupling of a phone speaker to the phone microphone Echoes are not only annoying but often superimpose on signals transmitted between over the channel degrading the quality of signals. Electronic and acoustic echoes are discussed below.

Generally, two-wire telephone lines are used to connect subscribers' communication devices to switching exchanges, hereinafter referred to as "exchange(s)", which route signals from different subscribers to their appropriate destinations. Four-wire telephone lines are typically used to connect exchanges. At the exchanges, the two-wire telephone lines from subscriber communication devices are connected to four-wire telephone lines by means of connectors known as hybrid circuits.

A signal sent by a subscriber, referred to hereinafter as "sender", to another subscriber, referred to hereinafter as "receiver", travels from the sender's device through a two-wire telephone line to the sender's local exchange, where it passes through the hybrid circuit into a four-wire telephone line. The signal is then routed through four-wire telephone lines to the local exchange of the receiver. At the receiver's local exchange, the signal passes through another hybrid circuit, which couples the signal to a two-wire telephone line leading to the communication device of the receiver.

Impedances between the two-wire telephone lines and the four-wire telephone lines connected at a hybrid are often mismatched. As a result, a portion of a sender signal received at the hybrid circuit in the receiver's switching exchange follows a path at the hybrid circuit known as an "echo path" that couples the portion into the four-wire telephone line so that it propagates back to the sender as an echo of the sender's own signal. The echo path is characterized by an echo path impulse response function, which "acts" on the sender signal to generate the echo.

Acoustic coupling between a speaker, for example of a receiver's phone or computer, and the microphone in the phone or computer, is usually a source of acoustic echo. A replica, generally modified, of a sender's voice, which is made audible and transmitted by the receiver's speaker, is picked up and retransmitted by the receiver's microphone to the sender generating thereby the acoustic echo. Acoustic echoes are affected by reflections from objects, such as wall, floors furniture and people in the neighborhood of the speaker and microphone. As in the case of network or electronic echo, an echo path impulse response function characterizes acoustic echoes. However, since a neighborhood of a speaker and microphone is subject to change as people and/or objects in the neighborhood move and/or are moved relatively frequently, an acoustic echo path is generally subject to more rapid change than an electronic echo path. As a result, acoustic echoes can be more difficult to deal with than electronic echoes.

Electronic and/or acoustic echoes, in a communication channel generated from a sender signal are often removed and/or reduced by the use of an echo canceller, installed at the receiver end of the communication channel. The canceller is adapted to generate a signal, hereinafter referred to as an "echo copy", substantially similar to the actual echo of the sender signal. The echo copy is subtracted from signals propagating from the receiver towards the sender by a subtractor module comprised in the canceller. If the echo copy is substantially equal to an actual echo it will substantially cancel the actual echo. A difference between an actual echo and a copy echo is generally referred to as the "residual echo error" and is equal to 0 if the echo is completely cancelled.

An echo copy is typically provided by an adaptive filter, which is comprised in the canceller and which produces the echo copy responsive to a model, hereinafter referred to as a "model echo path function" or "model function", of the echo path impulse response function. In order to provide the adaptive filter with the model function, the filter "trains" on, or "adapts" to, signals it receives and attempts to produce echo copies of the signals that are substantially replicas of actual electronic and/or acoustic echoes generated responsive to the received signals. Training or adaptation may be performed during a dedicated training session in which only training signals are transmitted to the filter. Training signals and echo path models for testing of speech echo cancellers are described in International Telecommunication Union ITU-T G.168 (August 2004), entitled "Digital Network Echo Cancellers", incorporated herein by reference. However, generally, training is not performed during or only during dedicated training periods but is an on-line process of adaptation in which the canceller continuously or periodically updates or adjusts itself to attempt to improve its echo canceling performance. Continuous or periodic on-line training—adaptation—is usually performed responsive to signals, e.g. data or voice signals, normally transmitted over the communication channel.

Typically, during training, the filter comprised in an echo canceller receives a portion of a signal received at a receiver, or for example at a hybrid circuit, and generates an echo copy based on a first approximation of the model function. The echo copy is then subtracted from an actual echo generated at the receiver or hybrid responsive to the received signal and a "residual echo error" is obtained, which is fed back into the adaptive filter. The filter uses the residual echo error to provide a new estimation of the model function. The described sequence is repeated in an iterative process until an estimation of the model function satisfies a suitable convergence criterion. A time required for convergence is referred to as "convergence time".

A problem encountered by cancellers is their response to narrowband "tonal signals", for example 2100 or 2225 Hz "answer" tones, various call progress, ring back and dial tones used in the PSTN, that are often transmitted over a communication channel. A sinusoidal signal is an example of a narrowband tonal signal. Typically, as depicted in the echo path models shown in ITU-T G.168, echo paths exhibit a relatively wideband frequency response over the voice frequency spectrum. If the canceller trains on and adapts to only tonal signals, the canceller's filter may be adapted to produce a model function that functions properly only for frequencies in the narrow frequency range of the tonal signal. An echo copy may then extend over only a relatively small portion of the frequency range for which echoes are produced. Echo cancellation may therefore be effective substantially only in a range of frequencies spanned by the tonal signals.

A relatively large number of echo cancellers attempt to remedy this problem by freezing or slowing their adaptation process, when they receive tonal signals although this remedy has several disadvantages. For example, if the training is frozen, incorrect handshaking may result due to the superposition of the echo on the tonal signal, which may result in tonal signal distortion, and therefore communication is not established.

U.S. Pat. No. 5,592,548, "System and Method for Avoiding False Convergence in the Presence of Tones in a Time-Domain Echo Cancellation Process", describes a system for inhibiting false convergence in an echo canceller. The echo canceller comprises an adaptive filter with an adaptation step size controlled to allow the adaptive filter to converge on an input signal.

SUMMARY

An aspect of some embodiments of the invention relates to providing an improved method of training an echo canceller comprised in a communication channel that is used to transmit at least one tonal signal.

An aspect of some embodiments of the invention, relates to providing a method of determining whether or not the echo canceller has trained and adapted to the at least one tonal signal to the detriment of its ability to cancel electronic and/or acoustic echoes generated by signals characterized by a frequency other than a frequency that characterizes the at least one tonal signal.

In accordance with an embodiment of the invention, an echo path used by the canceller responsive to which the canceller cancels echoes, is used to generate echo copies of a test signal characterized by at least one frequency different from the frequency of the at least one tonal signal. If echo copies of the test signal are not satisfactory the canceller is determined to be improperly trained to cancel echoes generated by signals characterized by a frequency other than a frequency that characterizes the at least one tonal signal.

In an embodiment of the invention, if the echo canceller is determined to be improperly trained, the canceller is retrained.

There is therefore provided in accordance with an embodiment of the invention, a method of determining if an echo canceller comprised in a communication channel that is used to transmit at least one tonal signal and characterized by a model echo path of the channel, is acceptably adapted to cancel echoes in the channel, the method comprising: determining a performance measure how well the canceller cancels echoes of at least one test signal characterized by at least one frequency different from a frequency of the at least one tonal signal; and determining if the canceller is acceptably adapted responsive to the measure.

Optionally the method comprises filtering the at least one test signal responsive to the model echo path to generate a test echo of the test signal. Optionally, determining the performance measure comprises determining how well the test echo approximates an echo of the test signal that the channel would generate. Optionally, determining the performance measure comprises receiving a copy of an echo of the at least one tonal signal generated by the canceller responsive to the model echo path. Optionally, determining the performance measure comprises generating a measure responsive to the tonal signal, the test signal and their respective echoes. Optionally, determining the performance measure comprises determining a measure of the relative energies in the tonal signal and its echo. Optionally, determining the performance measure comprises determining a measure of the relative energies in the test signal and its echo. Optionally, determining the performance measure comprises determining a ratio between the measures of the relative energies.

In some embodiments of the invention, the method comprises generating the at least one test signal. In some embodiments of the invention, the channel comprises a voice band channel. In some embodiments of the invention, the echoes in the channel comprise electronic echoes. In some embodiments of the invention, the echoes in the channel comprise acoustic echoes. In some embodiments of the invention, the test signal comprises a tonal signal. In some embodiments of the invention, the test signal comprises white noise. In some embodiments of the invention, the test signal comprises a signal that approximates a Kroneker delta function signal.

In some embodiments of the invention, determining the performance measure comprises periodically determining the performance measure.

In some embodiments of the invention, determining the performance measure comprises determining the performance measure during normal communication over the communication channel.

In some embodiments of the invention, the method comprises generating a signal indicating if a determination is made that the canceller is not acceptably adapted.

There is further provided in accordance with an embodiment of the invention, apparatus for determining if an echo canceller comprised in a communication channel that is used to transmit at least one tonal signal and characterized by a model echo path of the channel, is acceptably adapted to cancel echoes in the channel, the apparatus comprising: a signal generator configured to generate at least one test signal characterized by at least one frequency different from a frequency of the at least one tonal signal; circuitry that determines a performance measure of how well the canceller cancels echoes of the at least one test signal and responsive to the performance measure whether or not the canceller is acceptably adapted.

Optionally, the circuitry comprises a filter that receives the model echo path and at least one test signal and generates an echo of the test signal responsive to the model echo path.

Optionally, the circuitry that determines the performance measure comprises a comparison circuit circuitry that determines how well the echo of the test signal approximates an echo of the test signal that the channel would generate.

In some embodiments of the invention, the apparatus comprises a controller that controls the apparatus when to determine if the canceller is acceptably adapted. Optionally, the controller controls the apparatus to determine if the canceller is acceptably adapted periodically. Additionally or alternatively, the controller controls the apparatus to determine if the canceller is acceptably adapted during normal communication over the communication channel.

In some embodiments of the invention, the apparatus comprises circuitry that generates a signal indicating if the apparatus determines that the canceller is not acceptably adapted.

There is further provided in accordance with an embodiment of the invention, apparatus for determining if an echo canceller comprised in a communication channel that is used to transmit at least one tonal signal and characterized by a model echo path of the channel, is acceptably adapted to cancel echoes in the channel, the apparatus comprising: circuitry that receives the model echo path; circuitry that receives a signal transmitted over the communication channel and an echo generated by the echo canceller responsive to the transmitted signal; and circuitry that determines a performance measure of how well the canceller cancels echoes responsive to the echo path, the transmitted signals and the echo.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION OF EMBODIMENTS

Figure 1A:
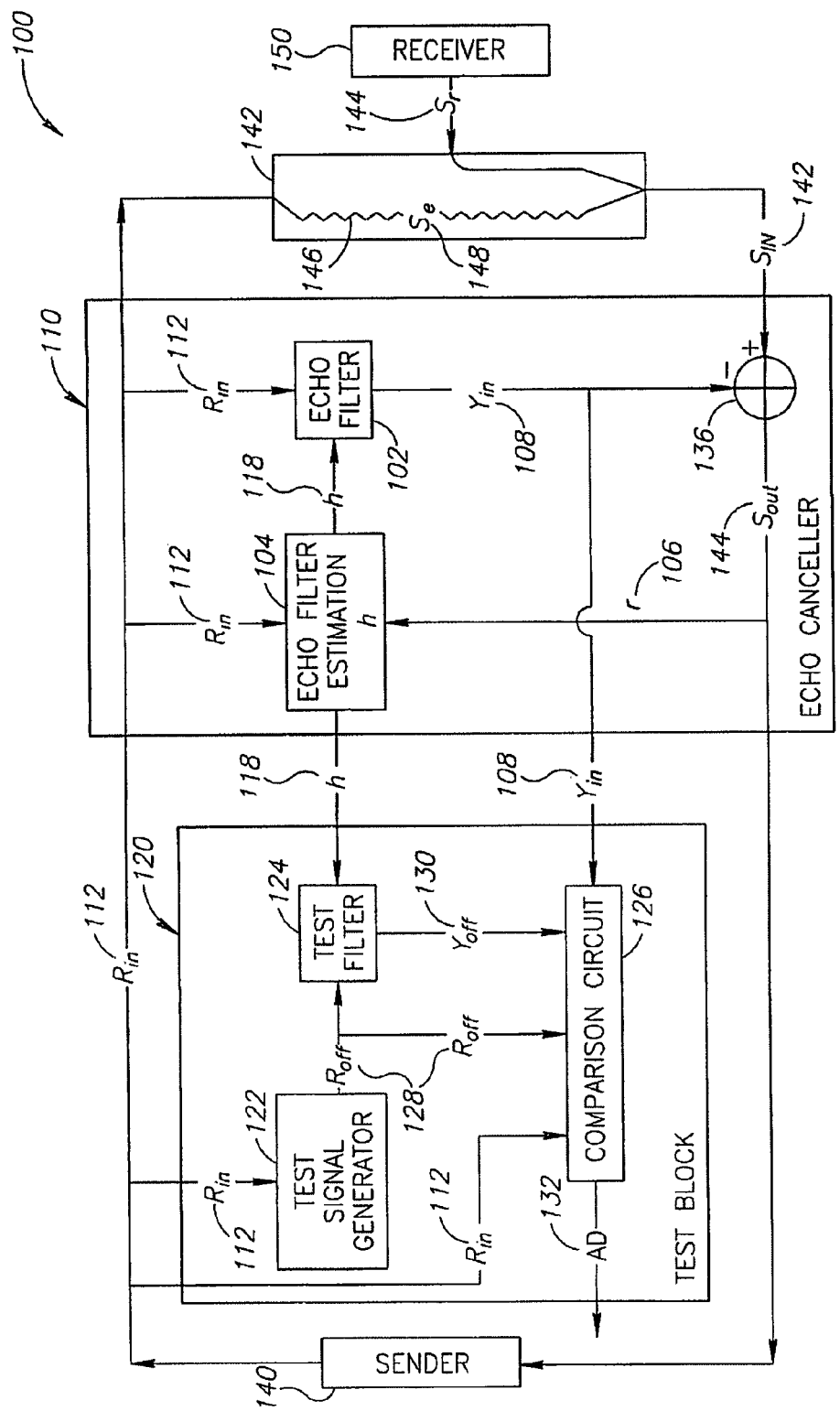
FIG. 1A shows a schematic block diagram of a system for providing an improved method of training an echo canceller responsive to electronic echoes, in accordance with an embodiment of the invention.

Reference is made to FIG. 1A, which shows an exemplary functional block diagram of a system 100 comprising an echo canceller 110 and a test circuit 120, for providing an improved method of adapting the echo canceller to cancel echoes in accordance with an embodiment of the invention. Echo canceller 110 may be any type of echo canceller known in the art that performs echo canceling in a communication network. Optionally, as shown in FIG. 1A, echo canceller 110 is schematically shown canceling echoes generated by a PSTN hybrid circuit 142, in voice-band network comprising 4-wire telephone lines connecting exchanges, which are connected to subscribers by two wire lines.

For convenience, it is assumed that echo canceller 110 trains on and adapts to signals "$R_{in}$" 112 that a sender 140 transmits to a receiver (a subscriber) 150 connected to a PSTN exchange (not shown) by hybrid circuit 142. The hybrid circuit generates an echo Se 148 of a given signal $R_{in}$ 112 responsive to an echo path 146, which echo is reflected back towards sender 140. Echo Se 148 may be superimposed on a signal Sr 144 sent by receiver 150 to sender 140 or propagate by itself to sender 150. The signal comprising echo Se 148 and optionally signal Sr 144 sent by receiver 150 is referred to hereinafter as a return signal $S_{in}$ 142.

Echo canceller 110 comprises an echo filter estimation circuitry 104, hereinafter referred to as "estimator", and an echo filter 102, both of which, in some embodiments of the invention may be implemented together as an adaptive filter in a Digital Signal Processor (DSP). Estimator 104 is adapted to estimate a model echo path function h 118 based on the input of signal $R_{in}$ 112 and a residual echo error r 106 defined below. Echo filter 102 is a filter with frequency response characteristics determined by model echo path function h 118. Echo filter 102 generates as an output an echo copy $Y_{in}$ 108 of "actual" echo $S_e$ 148 of signal $R_{in}$ 112 generated in hybrid circuit 142 responsive to $R_{in}$ and h. Residual echo error r 106 is a difference between echo copy $Y_{in}$ 108 and actual echo $S_e$ 148 of signal $R_{in}$ 112 generated in hybrid circuit 142 and is a measure of how well echo copy $Y_{in}$ 108 approximates actual echo $S_e$ 148.

Echo canceller 110 also comprises a subtractor circuit 136, hereinafter referred to as a "subtractor". Subtractor 136 is adapted to output a signal $S_{out}$ 144 in response to echo copy $Y_{in}$ 108 and return signal $S_{in}$ 142. Signal $S_{out}$ 144 is equal to a difference between echo copy $Y_{in}$ 108 and return signal $S_{in}$ 142 and is the signal sent to sender 140. $S_{out}$ 144 is equal to echo error r 106 when $S_{in}$ 142 contains only actual echo $S_e$ 148 of $R_{in}$ 112. As mentioned above r 106 is used as an input to estimator 104 in order to calculate model echo path function h 118.

As noted above, an echo canceller such as echo canceller 110 will often train and adapt improperly if during training it receives tonal signals, such as single tone, dual tones, multiple tone and fax signals, which are commonly used for example in handshaking applications. For example, echo canceller 110 may not function properly over substantially the complete voice frequency spectrum to reduce or substantially eliminate echo $S_e$ 148 if signal $R_{in}$ 112 comprises a tonal signal. Furthermore, as a result of improper training and adaptation responsive to tonal signals that it receives, during subsequent communications, performance of echo canceller 110 may degrade as it continuously or periodically adapts and its model echo path function h 118 diverge from actual echo path 146.

In accordance with an embodiment of the invention, test circuit 120, periodically tests echo canceller 110 to determine whether echo canceller 110 has trained and adapted improperly as a result of adapting to a tonal signal. Test circuit 120 optionally comprises a test signal generator 122, test filter 124, comparison circuit 126, and a controller (not shown). In accordance with an embodiment of the invention, test filter 124 receives model echo path h 118 optionally from canceller 110 and configures itself to filter signals in accordance thereto.

Optionally, the controller determines when test circuit 120 tests canceller 110. In some embodiments of the invention, the controller controls the test circuit to test the canceller at regular intervals. Optionally, the controller controls the test circuit to test the canceller responsive to performance of the canceller. Any of various methods known in the art may be used by test circuit 112 to determine performance of canceller 110. For example, the test circuit may use an opening of an eye to test performance of the canceller. In some embodiments of the invention the controller controls test circuit 120 to test canceller 110 responsive to a characteristic of signals $R_{in}$ 112 that are transmitted to receiver 150. For example, the controller optionally controls test circuit 120 to test the echo canceller if $R_{in}$ 112 is a narrow band signal, such as a tonal signal that might be suspected of causing the canceller to be unsatisfactorily trained.

To test canceller 110, test signal generator 122 in test circuit 120 optionally receives a copy of a signal $R_{in}$ 112 that is transmitted to receiver 150 and generates a test signal $R_{off}$ 128 responsive to $R_{in}$ 112 for testing how well model echo path h 118 approximates actual echo path 146 of hybrid circuit 142. $R_{off}$ 128 is characterized by a frequency spectrum different from that of $R_{in}$ 112. Optionally the frequency spectrum of $R_{off}$ is characterized by at least one frequency different from that of $R_{in}$ 112. For example, if $R_{in}$ 112 is a tonal signal, optionally $R_{off}$ 128 is a tonal signal, frequency shifted relative to $R_{in}$ 112 or a broadband signal comprising white noise and/or speech. Optionally, $R_{off}$ 128 is a predetermined test signal having a frequency spectrum different from that of tonal signals, such as for example various handshaking, call progress, ring back and dial tones used by the PSTN. Optionally, $R_{off}$ 128 is a signal that approximates a Kroneker delta function signal, which is momentary in time and has a broadband, flat, white noise-like spectrum. (An ideal delta function signal has an infinitely wide, flat spectrum.)

Test signal generator 122 transmits test signal $R_{off}$ 128 to test filter 124, which filters the test signal it receives responsive to model echo path h 118 to generate a test echo signal $Y_{off}$ 130 which it transmits to comparison circuit 126. The comparison circuit also receives a copy of $R_{off}$ 128, optionally from test signal generator 122. Comparison circuit 126 uses test echo $Y_{off}$ 130 and test signal $R_{off}$ 128 to generate a performance measure that indicates how well model echo path h 118 approximates actual echo path 146 and thereby how well echo canceller 110 functions to cancel echoes generated by signals that are not characterized by a tonal frequency or frequencies. If the indication is satisfactory, test circuit 120 determines that canceller 110 is acceptably adapted to cancel echoes generated by signals, such as voice signals, transmitted by sender 140 to receiver 150. On the other hand, if the indication is not satisfactory, test circuit 120 generates a signal AD 132 indicating that echo canceller 110 is improperly adapted and that advantageously canceller 110 should retrain anew to generate a new echo path rather than adjust the present echo path.

In some embodiments of the invention comparison circuit 126 compares an energy $E(Y_{off})$ of test echo $Y_{off}$ 130 to energy $E(R_{off})$ of test signal $R_{off}$ 128, to provide a performance measure indicating how well model echo path h 118 approximates actual echo path 146. Optionally, comparison circuit 126 generates a ratio $RE_{off}=E(Y_{off})/E(R_{off})$ of the energies of test echo $Y_{off}$ 130 and test signal $R_{off}$ 128 to provide the performance indication. In some embodiments of the invention, comparison circuit 126 receives a copy of $R_{in}$ and a copy of $Y_{in}$ 108 and generates a ratio $RE_{in}=E(Y_{in})/E(R_{in})$ of their respective energies $E(Y_{in})$ and $E(R_{in})$. Optionally, the comparison circuit determines that model echo path h 118 satisfactorily approximates actual echo path 146 and that canceller 110 is acceptably adapted if a difference between $RE_{off}$ and $RE_{in}$ is less than a suitable maximum acceptable difference. On the other hand, if the difference is greater than the maximum acceptable difference, comparison circuit 126 determines that canceller is not properly adapted and test circuit 120 generates a signal AD 132.

Figure 1B:
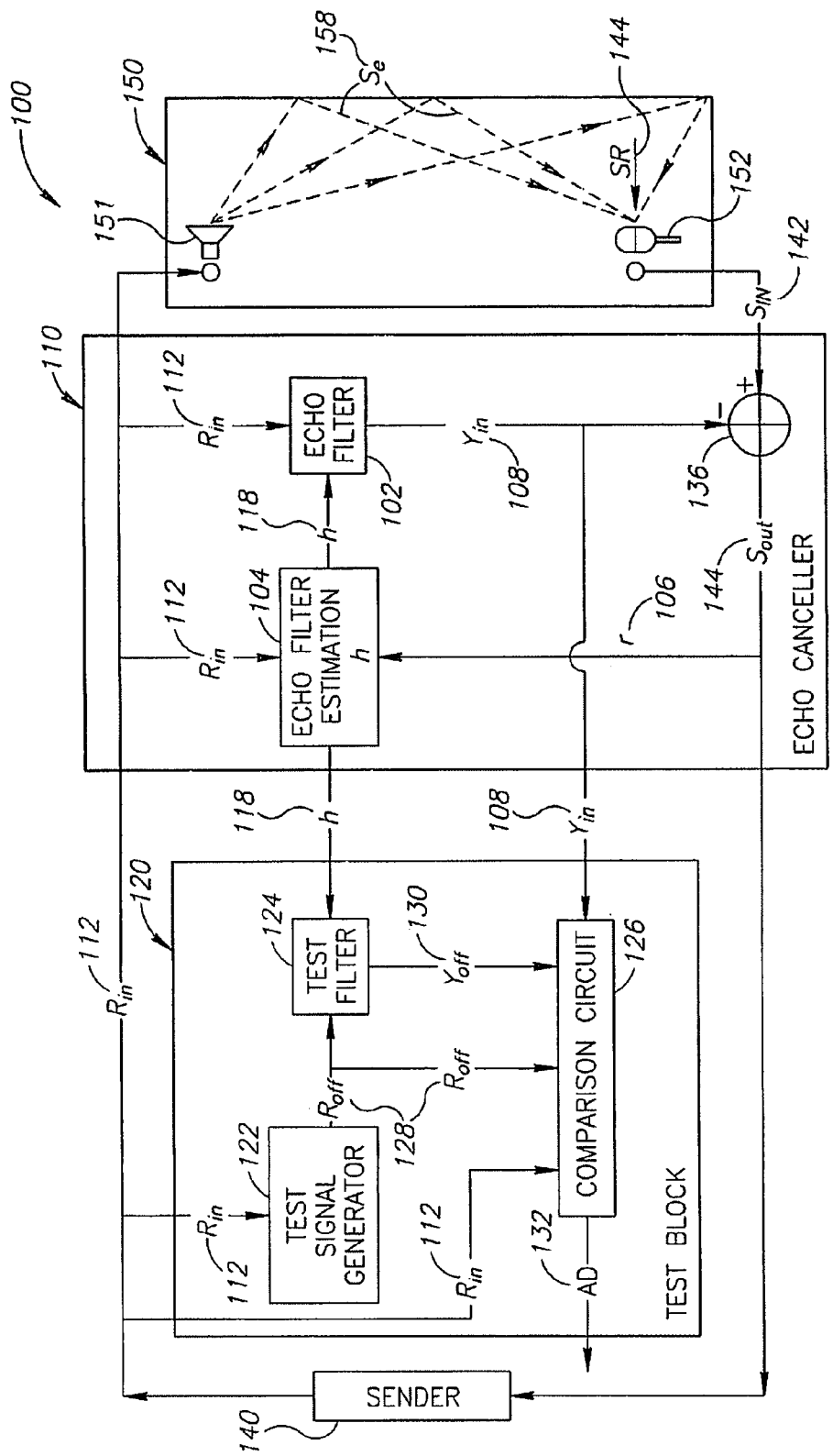
FIG. 1B shows the system shown in FIG. 1A providing an improved method of training an echo canceller responsive to acoustic echoes, in accordance with an embodiment of the invention.

Reference is made to FIG. 1B, which shows an exemplary functional block diagram of the system 100 shown in FIG. 1A comprising echo canceller 110 and test circuit 120, for providing an improved method of adapting an echo canceller to acoustic echoes in accordance with an embodiment of the invention. By way of example, an acoustic echo $S_e$ 158 is assumed generated in a room 150 as a result of sound waves originating from a loudspeaker 151 of a telephone system responsive to signals $R_{in}$ received from sender 140. Echo $S_e$ 158 comprises sound waves from the loudspeaker that are reflected from walls, ceiling, floor and objects in room 150 into a microphone 152 of the telephone system.

System 100 operates in a manner similar to that described for FIG. 1A to cancel acoustic echo $S_e$ 158 and test the efficacy of echo canceller 110 to cancel the echo. It is noted that whereas FIGS. 1A and 1B schematically show test circuit 120 and echo canceller 110 canceling and testing echo canceling of acoustic echoes separately from electronic echoes, electronic and acoustic echoes can and do of course occur simultaneously and test circuit and canceller 110 operate responsive to the echoes simultaneously. That is, accordance with an embodiment of the invention, signal $S_{in}$ 142 may comprise acoustic echo and/or echo generated by hybrid circuit 142 (FIG. 1A).

Figure 2:
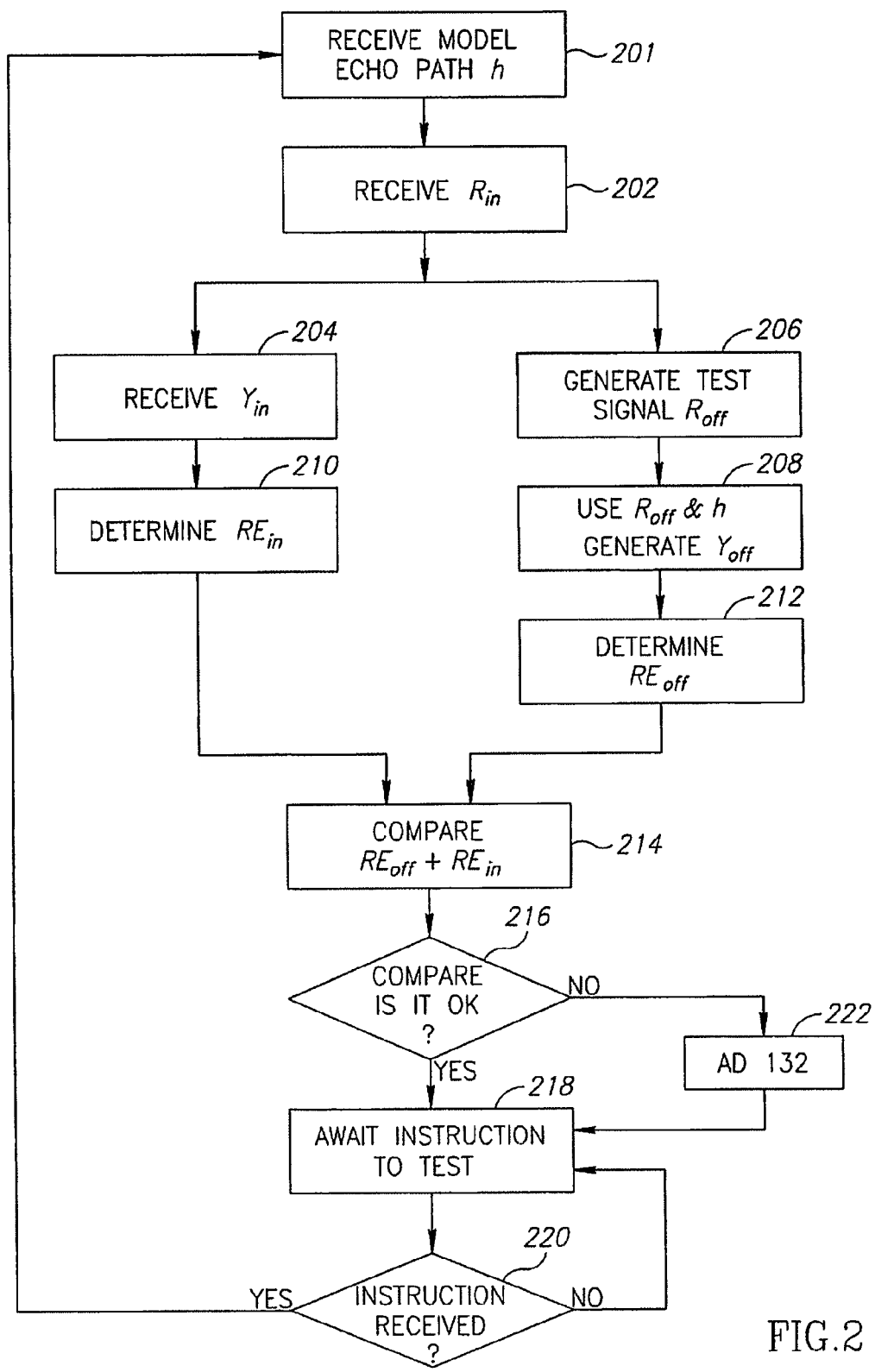
FIG. 2 illustrates a simplified flow chart of the operation of the system shown in FIGS. 1A and 1B, in accordance with an embodiment of the invention.

Reference is made to FIG. 2, which shows a simplified flow chart illustrating operation of test circuit 120 in accordance with an embodiment of the invention.

In a block 201, test circuit 120 receives model echo path function h 118 generated by echo canceller 110 (FIG. 1A, 1B) responsive to signals $R_{in}$ 112 that it receives, at least one of which signals is assumed to comprise a tonal signal. In a block 202, test circuit 120 receives a copy of a given signal $R_{in}$ 112 that is transmitted to receiver 150. The given signal $R_{in}$ may by way of example be a communication signal transmitted to the receiver during normal communication between sender 140 and receiver 150, and/or a tonal signal and/or a dedicated training signal. Model echo path function h 118 is used by echo canceller 110 to generate an echo copy $Y_{in}$ 108 responsive to the given signal $R_{in}$ 112. In a block 204 test circuit 120 receives a copy of $Y_{in}$ 108. In a block 206 test circuit 120 generates a test signal $R_{off}$. In a block 208, test circuit 120 generates an echo copy $Y_{off}$ responsive to $R_{off}$ and model echo path function h 118. Test circuit 120 uses $Y_{in}$ 108, $R_{in}$ 112, $Y_{off}$, and $R_{off}$ to determine if echo canceller 110 is satisfactorily adapted to cancel echoes generated responsive to signals transmitted to receiver 150.

Optionally, to determine if the echo canceller is satisfactorily adapted, in a block 210, test circuit 120 determines an energy ratio $RE_{in}=E(Y_{in})/E(R_{in})$ between energy $E(Y_{in})$ in echo copy $Y_{in}$ and energy in signal $R_{in}$. Optionally, in a block 212, test circuit 120 determines an energy ratio $RE_{off}=E(Y_{off})/E(R_{off})$ between energy $E(Y_{off})$ in echo copy $Y_{off}$ and energy in signal $R_{off}$. It is noted that for a test signal $R_{off}$ that approximates a Kroneker delta function, the ratio $RE_{off}$ may be determined from the "energy" of the filter, i.e. from the coefficients that determine echo path h 118 and thereby the filter. A test signal generator 122 and a test filter 124 are not required to determine $Y_{off}$ nor $RE_{off}=E(Y_{off})/E(R_{off})$. Therefore, for embodiments of the invention that compare operation of an echo canceller only to operation of the canceller on delta function signals, test circuit 120 optionally does not comprise signal generator 122 and test filter 124. Optionally, comparison circuit 126 receives echo path h 118 and determines a ratio $RE_{off}=E(Y_{off})/E(R_{off})$ from the echo path.

In a block 214, test circuit 120 compares $Re_{off}$ to $RE_{in}$ and proceeds to a decision block 216. In decision block 216, if the comparison indicates that $Re_{off}$ is sufficiently close to $RE_{in}$ responsive to a suitable criterion, test circuit 120 determines that echo canceller 110 is satisfactorily adapted and optionally proceeds to a step 218. In step 218, test circuit 110 awaits instruction to perform a next test of hybrid circuit 110. If in a decision block 220 test circuit 120 determines an instruction is received to test hybrid circuit 110, the test circuit returns to step 201. If not, it returns to await instruction in block 218. If on the other hand test circuit 120 determines that the energy ratios are not sufficiently close, it generates a signal AD 132 in block 222 indicating that echo canceller 110 is not satisfactorily adapted and advantageously that the echo canceller should be reset and trained anew. Test circuit 120 then proceeds to block 218.

In the description and claims of embodiments of the present invention, each of the words, "comprise" "include"

and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. The scope of the invention is limited only by the claims.

The invention claimed is:

1. A method of determining if an echo canceller comprised in a communication channel that is used to transmit at least one tonal signal and characterized by a model echo path of the channel, is acceptably adapted to cancel echoes in the communication channel, the method comprising:
   determining a performance measure of how well the echo canceller cancels echoes of at least one test signal characterized by at least one frequency different from a frequency of the at least one tonal signal;
   determining if the echo canceller is acceptably adapted responsive to the performance measure;
   filtering the at least one test signal responsive to the model echo path to generate a test echo of the test signal;
   wherein determining the performance measure comprises determining how well the test echo approximates an echo of the test signal that the communication channel would generate;
   wherein determining the performance measure comprises receiving a copy of an echo of the at least one tonal signal generated by the echo canceller responsive to the model echo path.

2. A method according to claim 1 wherein determining the performance measure comprises generating a measure responsive to the at least one tonal signal, the test signal and their respective echoes.

3. A method according to claim 2 wherein determining the performance measure comprises determining a measure of the relative energies in the tonal signal and its echo.

4. A method according to claim 3 wherein determining the performance measure comprises determining a measure of the relative energies in the test signal and its echo.

5. A method according to claim 4 wherein determining the performance measure comprises determining a ratio between the measures of the relative energies.

6. A method according to claim 1 and comprising generating the at least one test signal.

7. A method according to claim 1 wherein the communication channel comprises a voice band channel.

8. A method according to claim 1 wherein the echoes in the communication channel comprise electronic echoes.

9. A method according to claim 1 wherein the echoes in the communication channel comprise acoustic echoes.

10. A method according to claim 1 wherein the test signal comprises a tonal signal.

11. A method according to claim 1 wherein the test signal comprises white noise.

12. A method according to claim 1 wherein the test signal comprises a signal that approximates a Kroneker delta function signal.

13. A method according to claim 1 wherein determining the performance measure comprises periodically determining the performance measure.

14. A method according to claim 1 wherein determining the performance measure comprises determining the performance measure during normal communication over the communication channel.

15. A method according to claim 1 and comprising generating a signal indicating if a determination is made that the echo canceller is not acceptably adapted.

16. An apparatus for determining if an echo canceller comprised in a communication channel that is used to transmit at least one tonal signal and characterized by a model echo path of the channel, is acceptably adapted to cancel echoes in the communication channel, the apparatus comprising:
   a signal generator configured to generate at least one test signal characterized by at least one frequency different from a frequency of the at least one tonal signal;
   circuitry to determine a performance measure of how well the echo canceller cancels echoes of the at least one test signal and responsive to the performance measure and to further determine whether or not the echo canceller is acceptably adapted;
   circuitry to filter the at least one test signal responsive to the model echo path and to generate a test echo of the test signal;
   wherein the circuitry to determine the performance measure comprises a comparison circuitry to determine how well the test echo approximates an echo of the test signal that the communication channel would generate;
   wherein the circuitry to determine the performance measure comprises circuitry to receive a copy of an echo of the at least one tonal signal generated by the echo canceller responsive to the model echo path.

17. An apparatus according to claim 16 and comprising a controller to control the apparatus when to determine if the echo canceller is acceptably adapted.

18. An apparatus according to claim 17 wherein the controller is to control the apparatus to determine if the echo canceller is acceptably adapted periodically.

19. An apparatus according to claim 17 wherein the controller is to control the apparatus to determine if the echo canceller is acceptably adapted during normal communication over the communication channel.

20. An apparatus according to claim 16 and comprising circuitry to generate a signal indicating whether the apparatus determines that the echo canceller is not acceptably adapted.

* * * * *